United States Patent [19]
Reitter

[11] Patent Number: 5,722,645
[45] Date of Patent: Mar. 3, 1998

[54] ARRANGEMENT FOR INFLUENCING COIL SPRING TRAVEL

[75] Inventor: Horst Reitter, Renningen, Germany

[73] Assignee: Dr. Ing. h. c. F. Porsche AG, Germany

[21] Appl. No.: 659,519

[22] Filed: Jun. 6, 1996

[30] Foreign Application Priority Data

Jun. 16, 1996 [DE] Germany ............... 195 21 861.2

[51] Int. Cl.[6] ............... B60G 15/06; F16F 1/12
[52] U.S. Cl. ............... 267/177; 267/179; 267/287
[58] Field of Search ............... 267/140.2, 175, 267/177, 179, 255, 287, 286

[56] References Cited

U.S. PATENT DOCUMENTS

| | | | |
|---|---|---|---|
| 1,252,397 | 1/1918 | Carter | 267/177 X |
| 2,234,504 | 3/1941 | Robinson et al. | 267/286 X |
| 2,265,629 | 12/1941 | Christiansen | 267/175 |
| 3,365,194 | 1/1968 | Strickland, Jr. | 267/177 X |
| 3,701,544 | 10/1972 | Stankovich | 267/177 X |
| 4,736,983 | 4/1988 | Furbee | 297/209 |
| 4,962,834 | 10/1990 | Miner | |

FOREIGN PATENT DOCUMENTS

| | | |
|---|---|---|
| G 81 22 930.5 | 8/1981 | Germany. |
| 1290018 | 2/1987 | Germany ............... 267/287 |
| WO 94/05520 | 3/1994 | WIPO. |

OTHER PUBLICATIONS

Spring Design, Dr. W. R. Berry, Mechanical World, Feb. 1952, pp. 85-89.

*Primary Examiner*—Josie Ballato
*Attorney, Agent, or Firm*—Evenson, McKeown, Edwards & Lenahan, P.L.L.C.

[57] ABSTRACT

For changing the spring rate of a coil spring in a simple manner, a spacing element is screwable into the coil spring and can be locked in different positions with respect to the coil spring by way of a fixing device. The spring element can, for example, be screwed into the spring via its receiving groove.

20 Claims, 3 Drawing Sheets

ARRANGEMENT FOR INFLUENCING COIL SPRING TRAVEL

BACKGROUND AND SUMMARY OF THE INVENTION

The present invention relates to an arrangement for influencing the spring travel of a coil spring of a wheel suspension, and more particularly, to an arrangement in which at least one spacing element is arranged between coils of a coil spring.

DE 28 22 105 C2 discloses an arrangement for influencing influencing the spring travel in the case of a wheel suspension which consists of spacing segments arranged between the spring coils. Furthermore, a spring pad is shown in DE 28 05 223 and consists of a spacing element which can be screwed into the flat spiral spring.

It is an object of the invention to provide an arrangement for influencing the spring travel to ensure a simple adjustment and fixing, and for permitting various spring rate positions.

According to the invention, this object has been achieved by providing that the spacing element has a receiving groove extending corresponding to an ascent of the coil of the coil spring and the coils are held rigidly with respect to one another, and a fixing device for fixing the spacing element in various selected positions on the coil spring.

Among the principal advantages achieved with the present invention are that the spacing element can be screwed in a simple manner into the coil spring by a helically extending, corresponding receiving groove and can be locked in its different positions by a fixing device. So that a support with respect to the spring strut can take place by way of the spacing element, it is adjustable in its level via a thread on the cylindrical tube of the strut. A securing takes place by way of a counter nut.

For the simple adjusting and fixing of the spacing element in the coil spring, the fixing element is used which consists of a sleeve pin and which engages in a recess of the spring coil in a locking manner.

Different spring rigidities are taken up by rotating the spacing element in the coil spring and are fixed by way of the sleeve pin. The sleeve pin can be inserted into bores which are arranged in a bounding ring of the receiving groove. Each bore is used for one position of the spring rigidity, and thus a soft and a tight suspension can be implemented.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
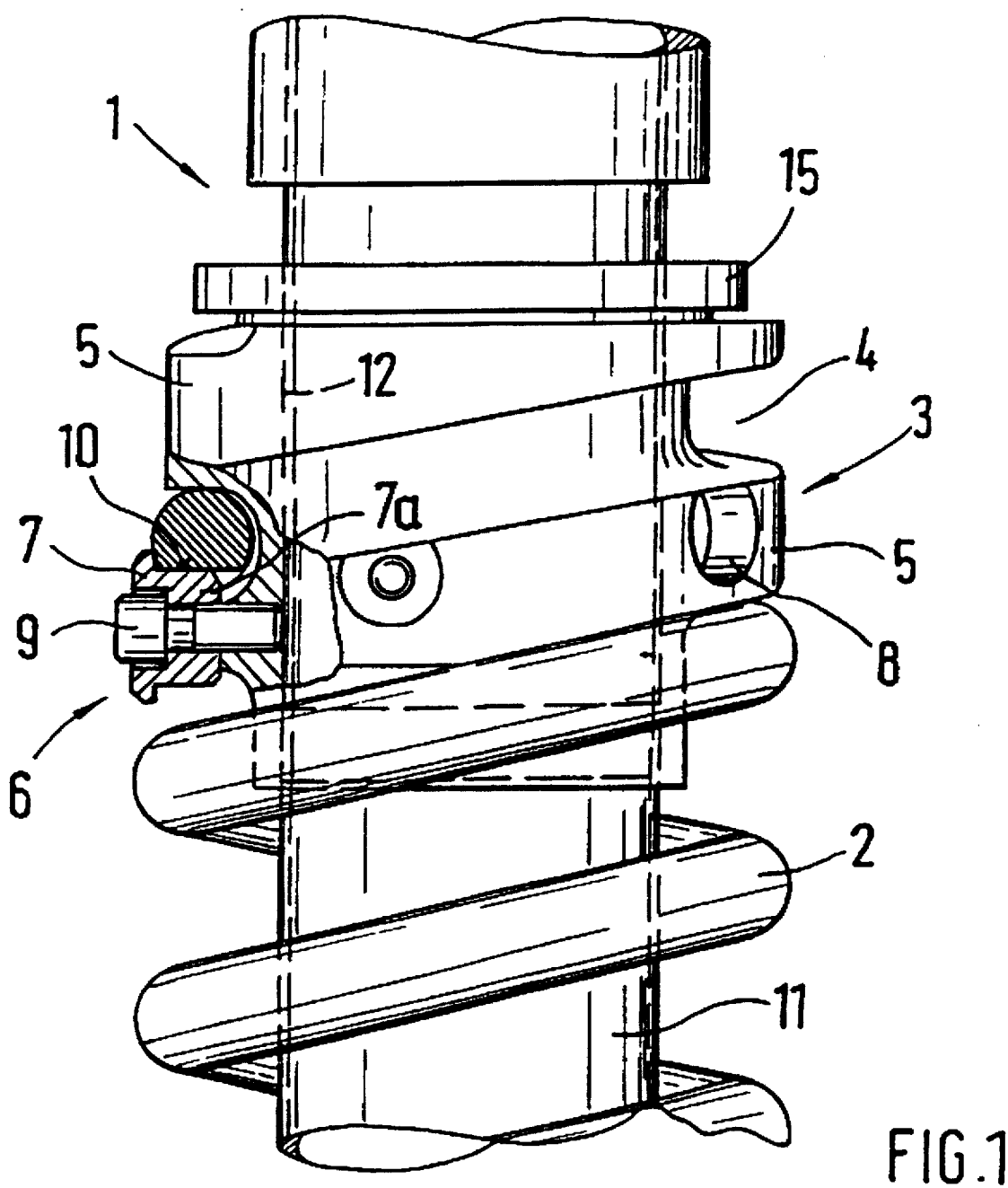
FIG. 1 is a partial elevational view of a spring strut with an inserted and locked spacing element.
Figure 2:
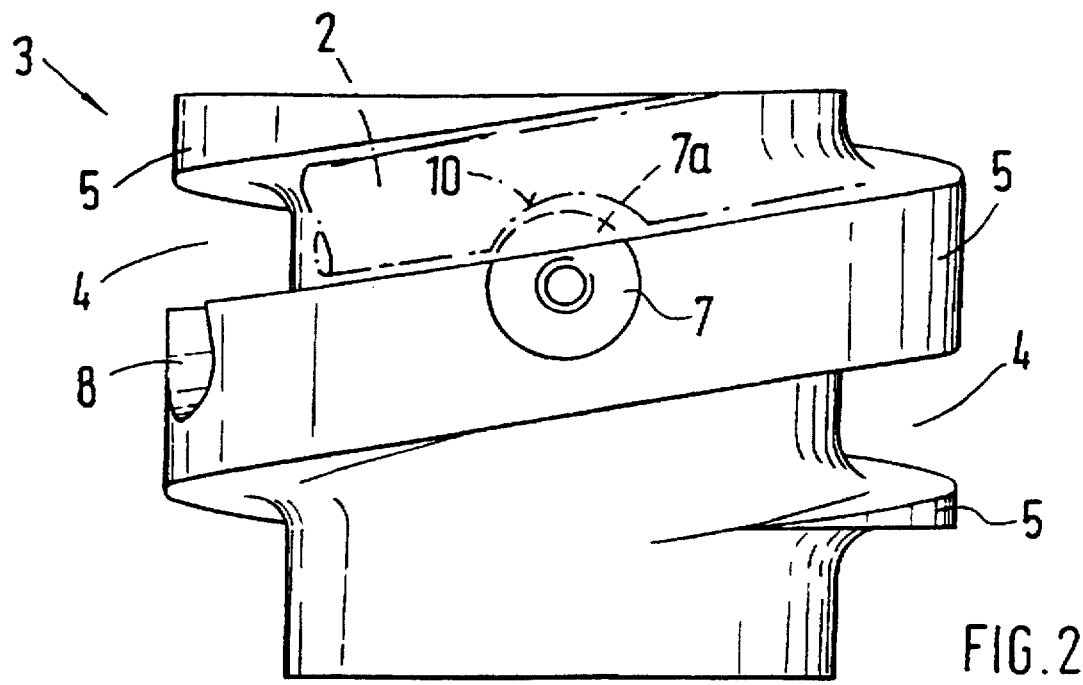
FIG. 2 is a schematic representation of the spacing element.

A coil spring 2 surrounding the spring strut designated generally by numeral 1 is supported between spring plates. An upper support is formed by a spacing element 3 which is used for changing the spring rate of the vehicle coil spring by varying the coil number. Therefore, without a removal of the shock absorber, the spring rate in the vehicle can be changed in a simple manner via the spacing element 3.

The spacing element 3 has a receiving groove 4 which extends corresponding to the ascent of the spring coil and in which a spring segment or several spring segments are received and are held rigidly with respect to one another. For this purpose, the individual spring segments are arranged in a non-resilient manner with respect to one another because of interposed spacing rings 5 bounded by the receiving groove 4 and following the groove 4.

By way of a fixing device 6, the spacing element 3 can be fixed to the coil spring 2. This fixing device 6 consists essentially of a sleeve pin 7 which can be inserted into a bore 8 of the spacing element 3 and can be fixed in it by way of a screw 9. In at least one spring coil of the coil spring 2, a recess 10 engages with the sleeve pin 7 and accommodates therein a partial section 7a of the sleeve pin 7.

Figure 3:
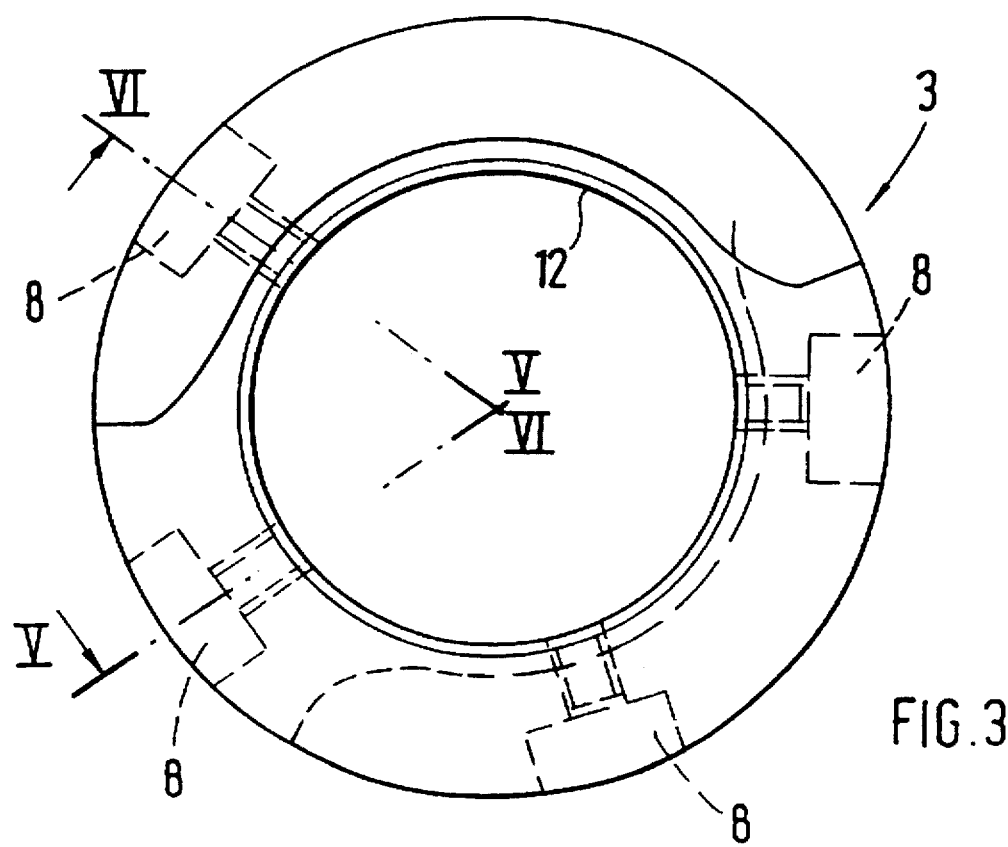
FIG. 3 is a top view of the spacing element shown in FIG. 2.
Figure 4:
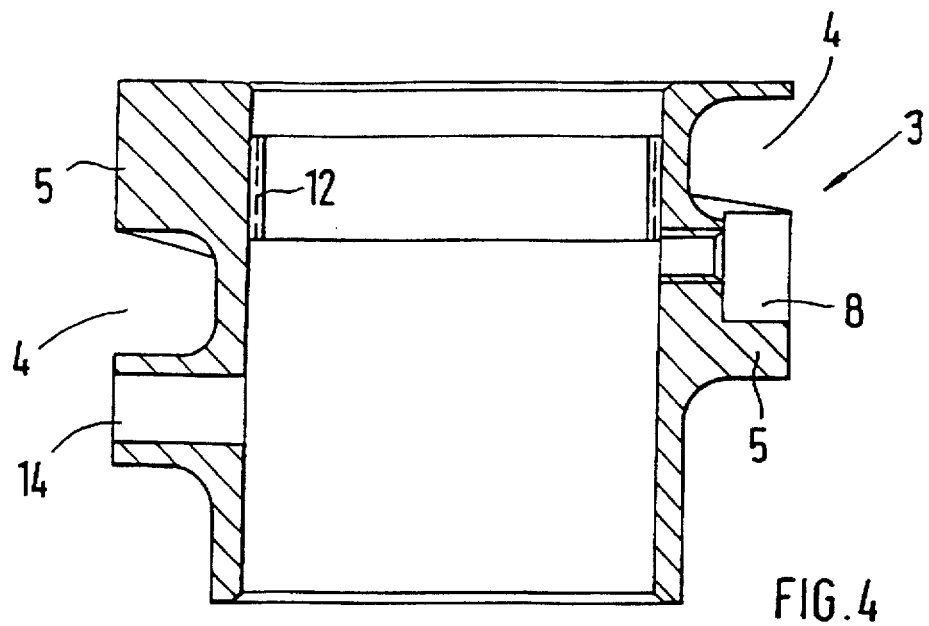
FIG. 4 is a longitudinal sectional view of the spacing element of FIGS. 2 and 3.
Figure 5:
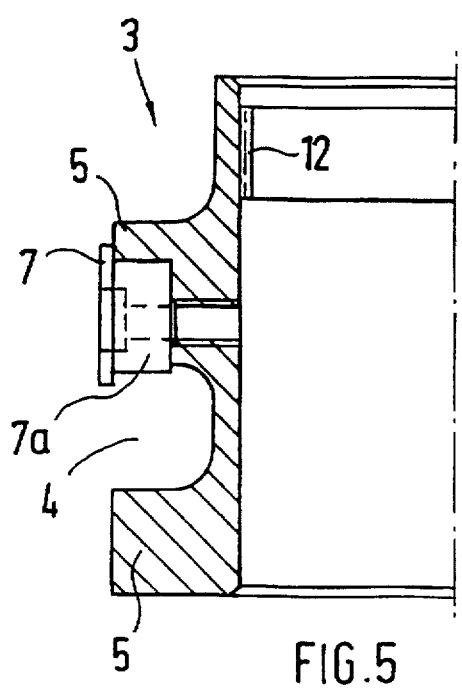
FIG. 5 is a sectional view of the spring element along line V—V of FIG. 3 of the spacing element.
Figure 6:
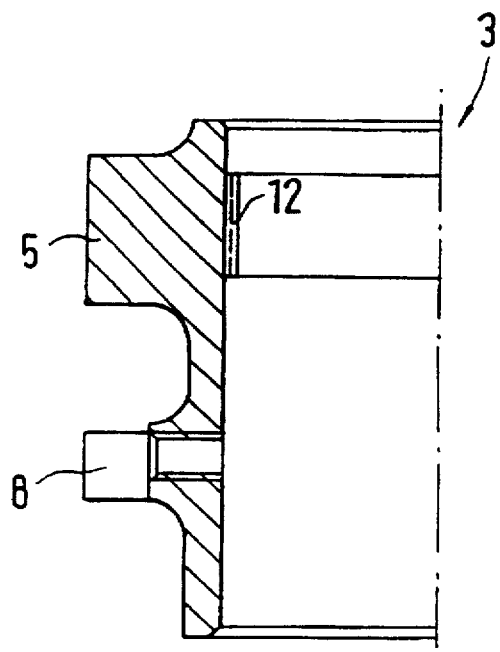
FIG. 6 is a sectional view of the spacing element along line VI—VI of FIG. 3.

In the spacing element 3, several bores for the sleeve pin 7 are provided for the various spring rates of the coil spring 2 to be adjusted in the spacing ring 5. These bores 8 are, in each case, open in the direction of the spring coil so that the partial section 7a of the sleeve pin 7 protrudes and can engage in the recess 10 in a locking manner, as illustrated in FIG. 3.

The spacing element 3 can be screwed into the coil spring 2 by way of the receiving groove 4, in which case it is guided on the cylinder housing 11 of the strut 1 via a common thread 12 and is to be fixed by a counter nut 15.

By a screwing-in and unscrewing of the spacing element 3, the rigidity of the spring 2 can be influenced correspondingly. According to the desired spring rate, the bores 8 can be arranged in the spacing element 3 either at the same distance and/or at different distances, in which case several recesses may also be provided in the coil or coils.

For rotating the spacing element 3 by way of a tool, corresponding bores 4 or similar recesses are provided in the spacing element 3.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Arrangement for influencing spring travel of a coil spring of a vehicle wheel suspension, comprising at least one spacing element arranged between coils of a coil spring, wherein the spacing element has a receiving groove extending corresponding to coil pitch of the coil spring and the coils are held rigidly with respect to one another, and a device for form locking engaging a recess portion of the coil spring for fixing the spacing element in various selected positions on the coil spring.

2. The arrangement according to claim 1, wherein the spacing element is screwable into the coil spring by way of the receiving groove and is connectable in several positions with the coil spring via the fixing device.

3. An arrangement for influencing spring travel of a coil spring of a vehicle wheel suspension, comprising at least one spacing element is arranged between coils of a coil spring, wherein the spacing element has a receiving groove extending corresponding to an ascent of the coil of the coil spring and the coils are held rigidly with respect to one another, and a fixing device for fixing the spacing element in various selected positions on the coil spring, wherein the spacing element has a thread in an upper segment thereof and has level adjustability relative to a corresponding thread of a strut cylindrical tube.

4. The arrangement according to claim 3, wherein the spacing element is screwable into the coil spring by way of the receiving groove and is connectable in several positions with the coil spring via the fixing device.

5. The arrangement according to claim 3, wherein a counter nut is arranged to fix the spacing element on the strut cylindrical tube.

6. The arrangement according to claim 5, wherein the spacing element is screwable into the coil spring by way of the receiving groove and is connectable in several positions with the coil spring via the fixing device.

7. An arrangement for influencing spring travel of a coil spring of a vehicle wheel suspension, comprising at least one spacing element is arranged between coils of a coil spring, wherein the spacing element has a receiving groove extending corresponding to an ascent of the coil of the coil spring and the coils are held rigidly with respect to one another, and a fixing device for fixing the spacing element in various selected positions on the coil spring, wherein the fixing device comprises a holding element including a sleeve pin which is fittable into a bore of the spacing element and is fixable thereto via a screw, and, corresponding to an exposed partial section of the sleeve pin, at least one recess is provided in a coil, in which the sleeve pin lockingly engages by way of the partial section thereof.

8. The arrangement according to claim 7, wherein the spacing element is screwable into the coil spring by way of the receiving groove and is connectable in several positions with the coil spring via the fixing device.

9. The arrangement according to claim 7, wherein the spacing element has a thread in an upper segment thereof and has level adjustability relative to a corresponding thread of a strut cylindrical tube.

10. The arrangement according to claim 9, wherein a counter nut is arranged to fix the spacing element on the strut cylindrical tube.

11. An arrangement for influencing spring travel of a coil spring of a vehicle wheel suspension, comprising at least one spacing element is arranged between coils of a coil spring, wherein the spacing element has a receiving groove extending corresponding to an ascent of the coil of the coil spring and the coils are held rigidly with respect to one another, and a fixing device for fixing the spacing element in various selected positions on the coil spring, wherein the spacing element has, in a ring bounding the receiving groove, a plurality of bores for receiving the sleeve pin, and each bore constitutes a position of the spacing element with respect to the coil spring.

12. The arrangement according to claim 11, wherein the spacing element is screwable into the coil spring by way of the receiving groove and is connectable in several positions with the coil spring via the fixing device.

13. The arrangement according to claim 11, wherein the spacing element has a thread in an upper segment thereof and has level adjustability relative to a corresponding thread of a strut cylindrical tube.

14. The arrangement according to claim 13, wherein a counter nut is arranged to fix the spacing element on the strut cylindrical tube.

15. The arrangement according to claim 11, wherein the fixing device comprises a holding element including a sleeve pin which is fittable into a bore of the spacing element and is fixable thereto via a screw, and, corresponding to an exposed partial section of the sleeve pin, at least one recess is provided in a coil, in which the sleeve pin lockingly engages by way of the partial section thereof.

16. An arrangement for influencing spring travel of a coil spring of a vehicle wheel suspension, comprising at least one spacing element is arranged between coils of a coil spring, wherein the spacing element has a receiving groove extending corresponding to an ascent of the coil of the coil spring and the coils are held rigidly with respect to one another, and a fixing device for fixing the spacing element in various selected positions on the coil spring, wherein at least one bore configured to cooperate with a turning tool is arranged in the bounding ring of the receiving groove.

17. The arrangement according to claim 16, wherein the spacing element is screwable into the coil spring by way of the receiving groove and is connectable in several positions with the coil spring via the fixing device.

18. The arrangement according to claim 16, wherein the spacing element has a thread in an upper segment thereof and has level adjustability relative to a corresponding thread of a strut cylindrical tube.

19. The arrangement according to claim 16, wherein the fixing device comprises a holding element including a sleeve pin which is fittable into a bore of the spacing element and is fixable thereto via a screw, and, corresponding to an exposed partial section of the sleeve pin, at least one recess is provided in a coil, in which the sleeve pin lockingly engages by way of the partial section thereof.

20. The arrangement according to claim 16, wherein the spacing element has, in a ring bounding the receiving groove, a plurality of bores for receiving the sleeve pin, and each bore constitutes a position of the spacing element with respect to the coil spring.

* * * * *